US011551077B2

(12) United States Patent
Wang et al.

(10) Patent No.: US 11,551,077 B2
(45) Date of Patent: Jan. 10, 2023

(54) STATISTICS-AWARE WEIGHT QUANTIZATION

(71) Applicant: International Business Machines Corporation, Armonk, NY (US)

(72) Inventors: Zhuo Wang, Mountain View, CA (US); Jungwook Choi, Elmsford, NY (US); Kailash Gopalakrishnan, San Jose, CA (US); Pierce I-Jen Chuang, Briarcliff Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1123 days.

(21) Appl. No.: 16/007,984

(22) Filed: Jun. 13, 2018

(65) Prior Publication Data

US 2019/0385050 A1    Dec. 19, 2019

(51) Int. Cl.
*G06N 3/08* (2006.01)
*G06N 3/04* (2006.01)

(52) U.S. Cl.
CPC .............. *G06N 3/08* (2013.01); *G06N 3/04* (2013.01)

(58) Field of Classification Search
CPC .......... G06N 3/08; G06N 3/04; G06N 3/0454; G06F 7/523
See application file for complete search history.

(56) References Cited

U.S. PATENT DOCUMENTS

| 9,400,918 B2 | 7/2016 | Yin et al. |
| 2016/0328647 A1 | 11/2016 | Pilly et al. |
| 2017/0316311 A1 | 11/2017 | Pilly et al. |
| 2018/0285736 A1* | 10/2018 | Baum ..................... G06F 7/523 |
| 2018/0341857 A1* | 11/2018 | Lee ....................... G06N 3/0454 |

(Continued)

FOREIGN PATENT DOCUMENTS

CN          105512289          4/2016

OTHER PUBLICATIONS

Na et al., "On-Chip Training of Recurrent Neural Networks with Limited Numerical Precision", 2017, 2017 International Joint Conference on Neural Networks (IJCNN), pp. 3716-3723. (Year: 2017).*

(Continued)

*Primary Examiner* — Ying Yu Chen
(74) *Attorney, Agent, or Firm* — Amin, Turocy & Watson, LLP

(57) ABSTRACT

Techniques for statistics-aware weight quantization are presented. To facilitate reducing the bit precision of weights, for a set of weights, a quantizer management component can estimate a quantization scale value to apply to a weight as a linear or non-linear function of the mean of a square of a weight value of the weight and the mean of an absolute value of the weight value, wherein the quantization scale value is determined to have a smaller quantization error than all, or at least almost all, other quantization errors associated with other quantization scale values. A quantizer component applies the quantization scale value to symmetrically and/or uniformly quantize weights of a layer of the set of weights to generate quantized weights, the weights being quantized using rounding. The respective quantized weights can be used to facilitate training and inference of a deep learning system.

20 Claims, 10 Drawing Sheets

(56) References Cited

U.S. PATENT DOCUMENTS

| | | | |
|---|---|---|---|
| 2019/0050710 A1* | 2/2019 | Wang | G06N 3/063 |
| 2019/0138882 A1* | 5/2019 | Choi | G06N 3/082 |

OTHER PUBLICATIONS

Louizos, CL. et al.; "Bayesian Compression for Deep Learning"; 31st Conference on Neural Information Processing Systems (NIPS 2017); Nov. 2017.

Gupta, S. et al. ; "Deep Learning with Limited Numerical Precision"; IBM T.J. Watson Research Center, Yorktown; arXiv:1502.02551v1; Feb. 2015.

Baskin, C. et al.; "Streaming Architecture for Large-Scale Quantized Neural Networks on an FPGA-Based Dataflow Platform"; arXiv: 1708.00052v1; Jul. 2017.

Alvarez, R. et al.; "On the efficient representation and execution of deep acoustic models"; arXiv:1607.04683v2; Dec. 2016.

IBM; "Using quantized probabilities to overcome the requirement of fully observed data in generic Bayesian networks structure learning algorithms"; http://ip.com/IPCOM/000183826D; Jun. 2, 2009.

Anonymously; "Deep Learning Methods for Source Code Understanding"; http://ip.com/IPCOM/000248788D; Jan. 11, 2017.

ANONYMOUSLY; "Methods for Deep Learning Network Compression for Resource-Constrained Devices"; http://ip.com/IPCOM/000246620D; Jun. 21, 2016.

Bengio et al., "Estimating or Propagating Gradients Through Stochastic Neurons for Conditional Computation," arXiv:1308.3432v1 [cs.LG], Aug. 15, 2013, 12 pages.

Rastegari et al., "XNOR-Net: ImageNet Classification Using Binary Convolutional Neural Networks," arXiv:1603.05279v4 [cs.CV], Aug. 2, 2016, 17 pages.

Zhou et al., "Dorefa-Net: Training Low Bitwidth Convolutional Neural Networks With Low Bitwidth Gradients," arXiv:1606.06160v3 [cs.NE], Feb. 2, 2018, 13 pages.

Lin et al., "Neural Networks With Few Multiplications," arXiv:1510.03009v3 [cs.LG], Feb. 26, 2016, 9 pages.

Zhu et al., "Trained Ternary Quantization," arXiv: 1612.01064v3 [cs.LG], Feb. 23, 2017, 10 pages.

Li et al., "Ternary weight networks," arXiv: 1605.04711v2 [cs.CV], Nov. 19, 2016, 5 pages.

Miyashita et al., "Convolutional Neural Networks using Logarithmic Data Representation," computarXiv: 1603.01025v2 [cs.NE], Mar. 17, 2016, 10 pages.

* cited by examiner

STATISTICS-AWARE WEIGHT QUANTIZATION

BACKGROUND

The subject disclosure relates to weight quantization.

SUMMARY

The following presents a summary to provide a basic understanding of one or more embodiments of the disclosed subject matter. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, structures, computer-implemented methods, apparatuses, and/or computer program products that can facilitate forming electronic devices comprising spiral conductive structures are provided.

According to an embodiment, a computer-implemented method can comprise, for a set of weights, determining, by a system operatively coupled to a processor, a quantization scale as a function of a bit precision level, wherein the quantization scale comprises quantization scale values. The computer-implemented method also can include determining, by the system, a quantization scale value that reduces a quantization error of the set of weights in accordance with a defined quantization criterion relating to the quantization error. The computer-implemented method also can comprise quantizing, by the system, weights of at least a portion of a layer of the set of weights to generate quantized weights based on the quantization scale value.

Another embodiment relates to a system, comprising a memory that stores computer-executable components; and a processor, operatively coupled to the memory, that executes computer-executable components. The computer-executable components can comprise a quantizer management component that, for a set of weights: determines a quantization scale based on a number of quantization levels, wherein the quantization scale comprises quantization scale values; and determines, based on a defined quantization criterion relating to the quantization error, a quantization scale value that reduces a quantization error of weights of the set of weights. The computer-executable components also can include a quantizer component that quantizes weights of at least a portion of a layer of the set of weights to generate quantized weights based on the quantization scale value.

A further embodiment relates to a computer program product that facilitates quantizing weights, the computer program product comprising a computer readable storage medium having program instructions embodied therewith. The program instructions are executable by a processor to cause the processor to, for a set of weights, determine a quantization scale as a function of a bit precision level, wherein the quantization scale comprises quantization scale values. The program instructions also are executable by the processor to cause the processor to determine a quantization scale value of the quantization scale values that reduces a quantization error of the set of weights in accordance with a defined quantization criterion relating to the quantization error. The program instructions further are executable by the processor to cause the processor to quantize weights of at least a portion of a layer of the set of weights to generate quantized weights based on the quantization scale value.

These and other features will become apparent from the following detailed description of illustrative embodiments thereof, which is to be read in connection with the accompanying drawings.

DETAILED DESCRIPTION

Figure 1:
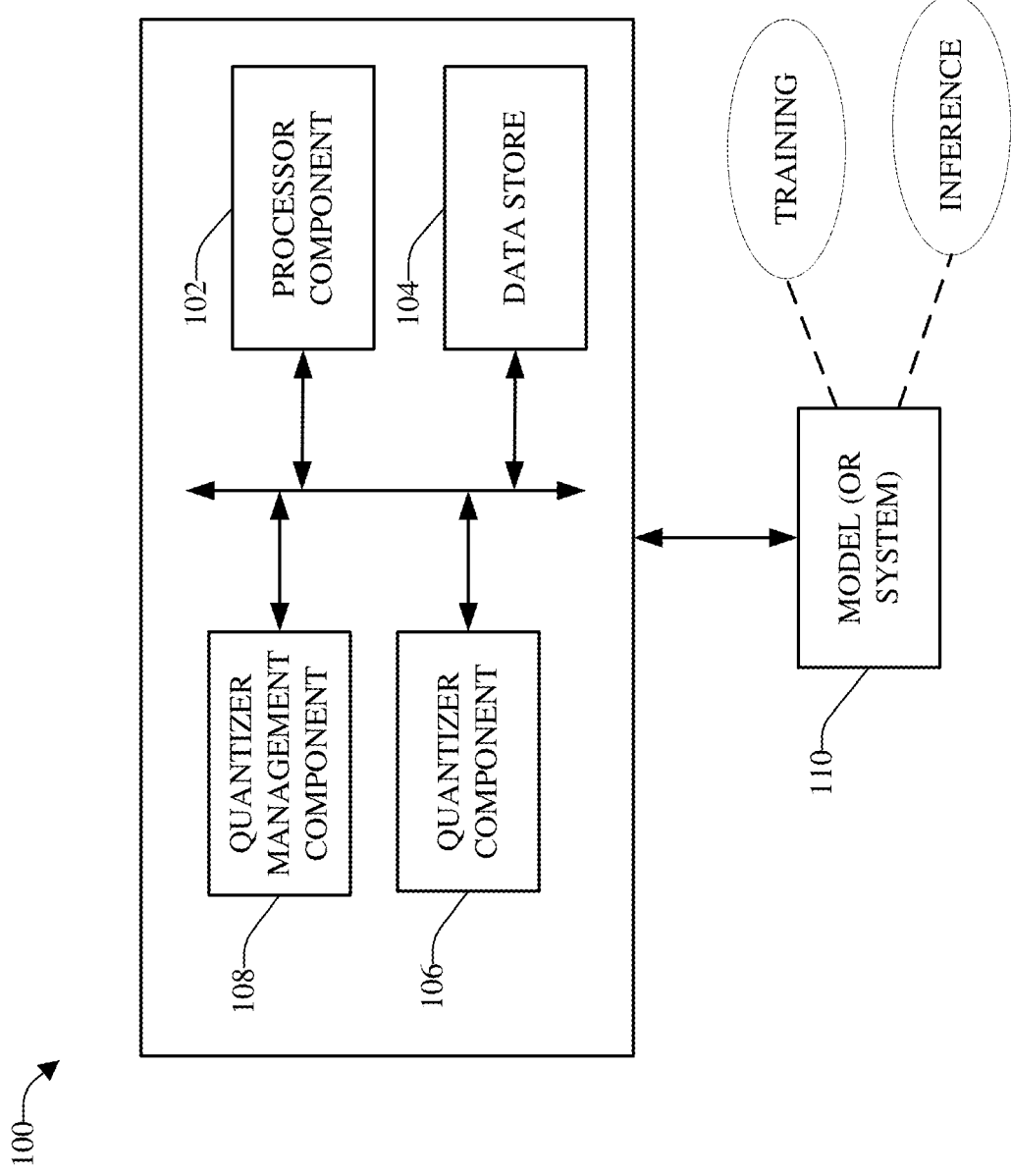
FIG. 1 illustrates a block diagram an example, non-limiting system that can employ statistics-aware weight quantization to facilitate reducing quantization errors of weights, in accordance with various aspects and embodiments of the disclosed subject matter.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

With regard to certain types of applications (e.g., computing-intensive applications), such as, for example, deep learning applications, it can be desirable to employ weight quantization to quantize weights for a given model (e.g., deep learning model) to facilitate training and inference of deep learning systems. Reducing the bit precision of weights can be beneficial for the training and inference of deep learning systems, as it can reduce the memory footprint and communication overhead for transferring data between layers (e.g., input network layer, intermediate network layers, output network layer) of a deep learning network (e.g., deep neural network), and it can reduce the complexity of computation to remove complex multipliers.

However, training a deep learning system with low-bit weights can be challenging. Quantization errors, if not handled well, can lead to severe and unacceptable degradations of accuracy. Some solutions are also not scalable. Further, some approaches can work relatively well for a small dataset; however, they do not work sufficiently well for a large dataset, such as, for example, ImageNet. Also, extension of quantization schemes to multiple bits instead of binary is not straight forward. Other solutions can cause severe degradation of accuracy due to quantization and can encounter undesirably expensive overhead for quantization during training and inference.

The various embodiments herein relate to techniques for statistics-aware weight quantization. The disclosed subject matter can facilitate reducing the bit precision of weights in connection with the training and inference of deep learning systems. The disclosed subject matter can comprise a quantizer management component that, for each weight of a set of weights, can estimate a quantization scale value to apply to the weight as a linear or non-linear function of the mean of a square of a weight value of the weight and the mean of an absolute value of the weight value. The quantizer management component can estimate, determine, and/or select the quantization scale value that has a smaller quantization error than all, or at least almost all, other quantization errors associated with other quantization scale values.

The quantizer management component and associated quantizer component can symmetrically and uniformly set quantization. The quantizer component can apply the quantization scale value (e.g., estimated quantization scale value (estimated $\alpha_w^*$) to symmetrically and/or uniformly quantize the weights of a layer of the set of weights to generate quantized weights, the weights being quantized using nearest rounding or another desired rounding technique. The respective quantized weights can be used to facilitate training and/or inference of a deep learning system (e.g., deep learning neural networks).

With respect to each weight of the set of weights, determining the quantization scale value (e.g., estimated quantization scale value) and utilizing the quantization scale value to quantize the weight to generate the quantized weight can reduce an amount of memory usage and/or an amount of communication overhead used to transfer data between layers of the deep learning system.

These and other aspects and embodiments of the disclosed subject matter will now be described with respect to the drawings.

FIG. 1 illustrates a block diagram an example, non-limiting system 100 that can employ statistics-aware weight quantization to facilitate reducing (e g, minimizing or at least substantially minimizing) quantization errors of weights, in accordance with various aspects and embodiments of the disclosed subject matter. The system 100 can be utilized to determine desirable quantization scale values (e.g., estimated quantization scale values) that can be applied to weights to desirably quantize weights to minimize, or at least substantially minimize, quantization errors of the weights (e.g., with regard to quantizing the weights), as more fully described herein. The quantized weights can be utilized to facilitate training or inference of deep learning systems (e.g., deep learning neural networks) or for other computing-intensive applications or systems.

The system 100 can comprise a processor component 102 that can be associated with a data store 104, and a quantizer component 106, and a quantizer management component 108. The processor component 102 can work in conjunction with the other components (e.g., data store 104, quantizer component 106, quantizer management component 108, . . . ) to facilitate performing the various functions of the system 100. The processor component 102 can employ one or more processors, microprocessors, or controllers that can process data, such as information relating to training models (e.g., deep learning models), using models to determine or generate inferences, applications (e.g., deep learning or training applications), weight distributions, statistics relating to weight distributions, determining or estimating desired quantization scale values to utilize in connection with quantizing weights, coefficients or functions associated with determining or estimating desired quantization scale values, parameters relating to training models or using models for inferences, parameters relating to quantizing weights, defined quantization criteria, algorithms (e.g., quantization algorithms, algorithm(s) for determining or estimating quantization scale values, number rounding algorithm, . . . ), data traffic flows (e.g., between components or devices, and/or across a network(s)), protocols, policies, interfaces, tools, and/or other information, to facilitate operation of the system 100, as more fully disclosed herein, and control data flow between components of the system 100, control data flow between the system 100 and other components or devices (e.g., models (e.g., deep learning models), applications, computers, computer networking devices, data sources, . . . ) associated with the system 100.

In accordance with various embodiments, the processor component 102 can comprise one or more processor components, lower precision (e.g., 16-bit) computation engines (lower precision floating-point units (FPUs)), higher precision (e.g., 32-bit, 64-bit, . . . ) computation engines (higher precision FPUs), graphics processing units (GPUs), accelerators, field-programmable gate arrays (FPGAs), and/or other processing units to perform or facilitate performing operations on data, including performing calculations on data (e.g., numerical data).

The data store 104 can store data structures (e.g., user data, metadata), code structure(s) (e.g., modules, objects, hashes, classes, procedures) or instructions, information relating to training models (e.g., deep learning models), using models to determine or generate inferences, applications (e.g., deep learning or training applications), weight distributions, statistics relating to weight distributions, determining or estimating desired quantization scale values to utilize in connection with quantizing weights, coefficients or functions associated with determining or estimating desired quantization scale values, parameters relating to training models or using models for inferences, parameters relating to quantizing weights, defined quantization criteria, algorithms (e.g., quantization algorithms, algorithm(s) for determining or estimating quantization scale values, number rounding algorithm, . . . ), data traffic flows (e.g., between components or devices, and/or across a network(s)), protocols, policies, interfaces, tools, and/or other information, to facilitate controlling operations associated with the system 100. In an aspect, the processor component 102 can be functionally coupled (e.g., through a memory bus or other bus) to the data store 104 in order to store and retrieve information desired to operate and/or confer functionality, at least in part, to the quantizer component 106, quantizer management component 108, and/or other components of the system 100, and/or substantially any other operational aspects of the system 100.

The quantizer component 106 and the quantizer management component 108 can be associated with (e.g., communicatively and/or functionally connected to) each other and with the processor component 102 and the data store 104 via one or more buses. The quantizer component 106 can quantize respective weights of a set of weights based at least in part on respective quantization scale values to generate respective quantized weights, in accordance with the defined quantization criteria, as more fully described herein. The quantizer management component 108 can determine or estimate the respective quantization scale values based at least in part on statistical information and/or statistical functions associated with weight distributions of respective subsets of weights of the set of weights, as more fully described herein.

The quantized weights can be utilized to facilitate training a model or system 110 (e.g., deep learning model or system) or producing inferences or other determinations based at least in part on the trained model or system 110. For example, the quantizer management component 108 and/or quantizer component 106 can apply or facilitate applying the quantized weights to the model or system 110 to train the model or system 110. As another example, the model or system 110 can generate and present (e.g., as a data output) inferences or other determinations that can be determined based at least in part on the training of the model or system 110, wherein the training of the model or system 110 can be based at least in part on the quantized weights utilized to train the model or system 110. The model or system 110 can relate to, for example, deep learning, machine training, cognitive computing, artificial intelligence, neural networks, and/or other computing-intensive tasks, problems, or applications. As a few non-limiting examples, the model or system 110 can relate to or be used for image recognition to recognize or identify objects (e.g., person, place, and/or thing) in an image(s) or video, speech or audio recognition to recognize or identify words and/or identities of voices in audio content (e.g., speech, broadcast with audio, song, and/or a program with audio), or textual recognition to recognize or identify textual data (e.g., words, alphanumeric characters) in textual content (e.g., book, manuscript, email, or set of documents, . . . ), and/or image, speech or audio, and/or textual generation.

In some embodiments, the quantizer management component 108 can determine whether the quantization is to be set symmetrically and/or uniformly, or neither symmetrically or uniformly. For instance, the quantizer management component 108 can determine whether the quantization is to be set symmetrically and/or uniformly, or neither symmetrically or uniformly based at least in part on user input information, a type of application or model (e.g., a particular type of deep learning application or model) associated with the weight quantization, a type of weight distribution for weights to be quantized, and/or another type of quantization criterion.

With regard to the user input information, a user can input information, for example, via an interface (e.g., keyboard, touch screen, mouse, trackpad, . . . ) to select whether the quantization is to be set symmetrically and/or uniformly, or set to be neither symmetrically or uniformly. The quantizer management component 108 can set the quantization to be symmetrical and/or uniform, or neither symmetrical or uniform, in response to the user input information. The type of weight distribution for weights to be quantized can comprise or relate to, for example, a Gaussian, uniform, Laplace, logistic, triangle, von Mises, or other type of weight distribution.

Figure 2:
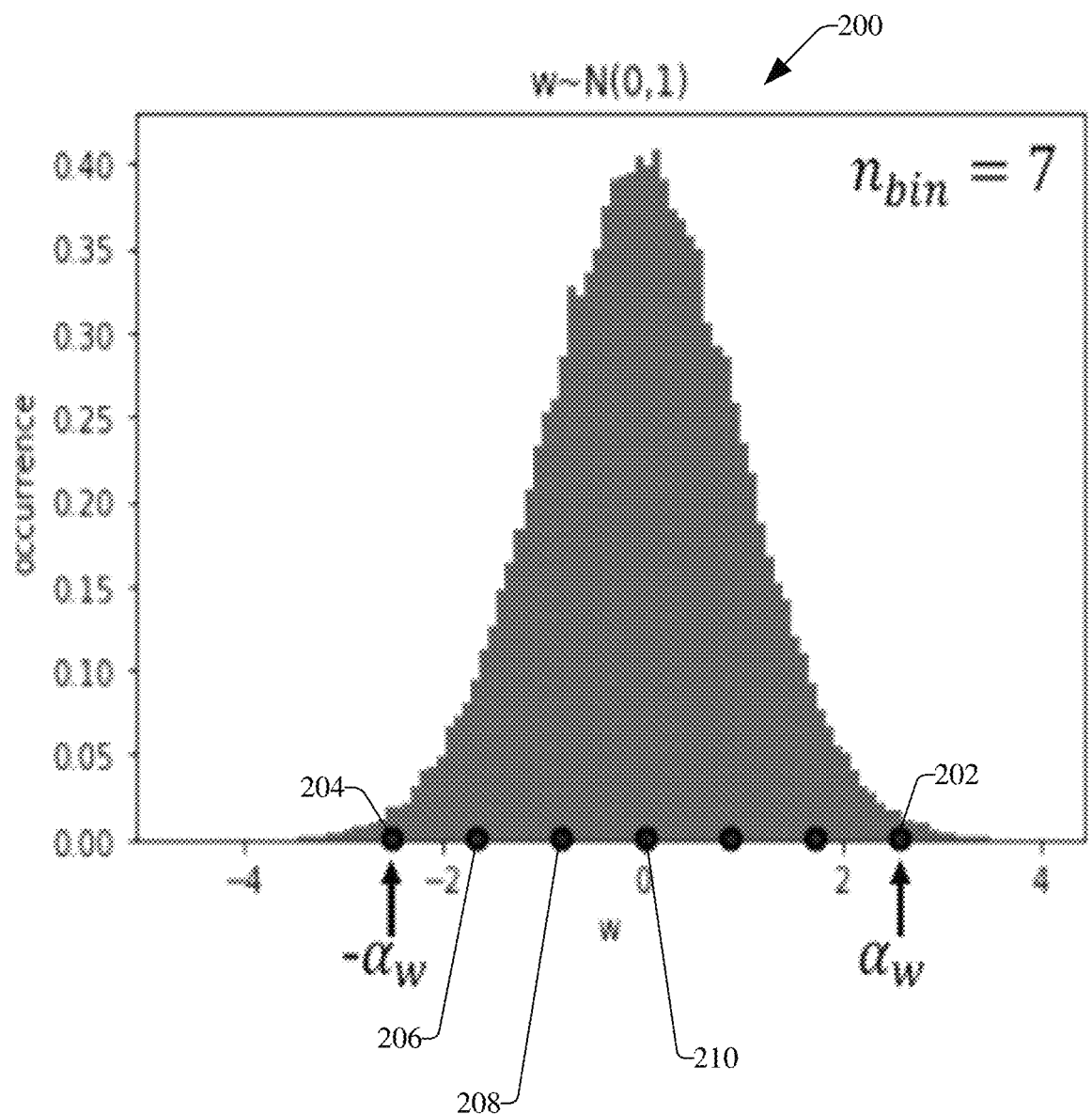
FIG. 2 depicts a diagram of an example, non-limiting weight distribution, in accordance with various aspects and embodiments of the disclosed subject matter.

Referring to FIG. 2 (along with FIG. 1), FIG. 2 depicts a diagram of an example, non-limiting weight distribution 200, in accordance with various aspects and embodiments of the disclosed subject matter. The example weight distribution 200 can illustrate the respective levels of occurrences for respective weight values, wherein occurrences are plotted along the y-axis and weight values are plotted along the x-axis. This example weight distribution 200 is for a bin number ($n_{bin}$) equal to 7. Desired or different bin numbers can be applied to weight distributions, wherein the bin number can be determined based at least in part on (e.g., as a function of) the bit precision level or quantization level desired, in accordance with the defined quantization criteria.

As can be seen in this example weight distribution 200, the quantization has been set (e.g., by the quantizer management component 108) to be symmetrical and uniform. For instance, with regard to the quantization scale $\alpha_w$, 202 in the weight distribution 200, it can be observed that there is a corresponding (e.g., mirrored) $-\alpha_w$ 204 in the weight distribution 200. Thus, the quantization has been set to be symmetrical. It also can be observed that the quantization has been set to be uniform in the weight distribution 200, as the spaces between respective bin points (e.g., bin points 206, 208, and 210) are uniform (e.g., there is the same amount of space between adjacent bin points).

The quantizer management component 108 also can determine whether the weights are to be quantized using nearest rounding of quantized weights (e.g., quantized weight values) or another desired rounding technique for rounding of quantized weights, and/or an offset value (e.g., a positive or negative bias or offset value) that can be applied to an intermediate quantized weight to facilitate generating the quantized weight (e.g., after rounding the combined value of the intermediate quantized weight and the offset value to the nearest quantized value). The quantizer management component 108 can make such determination regarding whether to use nearest rounding or another desired rounding technique for rounding of quantized weights, and/or the offset value based at least in part on user input information (e.g., input information from the user to select nearest rounding and/or the offset value), a type of application or model associated with the weight quantization, a type of weight distribution for weights to be quantized, and/or another type of quantization criterion.

With regard to nearest rounding, for example, in the weight distribution 200, if a quantized value is −1.6, if the quantizer management component 108 is employing nearest rounding, the quantized value can be rounded to the nearest number (e.g., nearest whole number), which can be −2 in this example. With regard to an offset, for example, in the weight distribution 200, if a quantized value is −1.6, and there is an offset of +0.2, the offset can be applied to the quantized value to produce an offset quantized value of −1.4, which, if nearest rounding is used, can be rounded to −1; alternatively, if the offset of −0.2, the offset can be applied to the quantized value to produce an offset quantized value of −1.8, which, if nearest rounding is used, can be rounded to −2.

It is to be appreciated and understood that, while embodiments of the disclosed subject matter describe using a nearest rounding technique to perform rounding of numbers (e.g., quantized weight values), the disclosed subject matter is not so limited. In accordance with various embodiments, the quantizer management component 108 and/or quantizer component 106 can employ any, or at least virtually any, other rounding technique to perform rounding of numbers (e.g., quantized weight values), as desired, wherein such other rounding techniques can comprise, for example, a rounding down technique that can be used for rounding a number down to a defined rounded number (e.g., a next lower whole number or other defined lower number), a rounding up technique that can be used for rounding a number up to a defined rounded number (e.g., a next higher whole number or other defined higher number), a rounding towards zero or truncation technique that can be used for rounding a number towards zero to a defined rounded number or to truncate a number to a defined rounded or truncated number, a random-based rounding technique (e.g., stochastic rounding technique) that can be used for rounding a number to a defined rounded number in a random or pseudo-random manner, or another(s) desired rounding technique.

The quantizer management component 108 further can determine the quantization scale $\alpha_w$ (e.g., $\alpha_w$ 202) to utilize for quantizing weights for at least a subset of weights based at least in part on the bit precision level. The subset of weights can be all or a portion of a layer of weights of a set of weights, for example. The bin number (e.g., the number of bins) for quantization can correspond to (e.g., be determined based at least in part on) the bit precision number, wherein the bit precision number can correspond to (e.g., be determined based at least in part on) the number of quantization levels (e.g., 2 levels, 3 levels, 4 levels, 8 levels, 16 levels, 32 levels, or another desired quantization level). The quantizer management component 108 can determine the bit precision level based at least in part on user input information (e.g., input information from the user to select the bit precision level), a type of application or model associated with the weight quantization, a type of weight distribution for weights to be quantized, and/or another type of quantization criterion. In the example weight distribution 200, the bit precision level can be set or selected to be 3 bits (e.g., by the quantizer management component 108), which can correspond to $n_{bin}$ being equal to 7 bins.

With regard to the quantization scale, there can be respective quantization scale values that, for a set of weights, can be associated with respective quantization errors for the weights. For each set of weights, there can be a quantization scale value of the respective quantization values that can minimize the quantization error of the weights, wherein such quantization scale value can be defined as $$\alpha_w^* = \underset{\alpha_w}{\mathrm{argmin}}\, mse(w, w_q).$$

For a set of weights (e.g., for each portion of a set of weights), the quantizer management component 108 can efficiently estimate or determine a desirable (e.g., suitable or optimal) quantization scale value $\alpha_w^*$ of the respective quantization scale values that can desirably reduce (e.g., significantly reduce or minimize) the quantization error of the weights based at least in part on one or more statistical functions, in accordance with the defined quantization criteria, wherein the one or more statistical functions can be based at least in part on statistical data (e.g., weight values of the weight distribution) associated with the set of weights, or portion of the set of weights. For instance, the quantizer management component 108 can analytically or statistically determine or estimate the relationship between desirable (e.g., enhanced, optimal, or suitable) quantized values for weights (e.g., for free parameters, such as non-quantized weights) with respect to statistical characteristics of the weight distributions to desirably (e.g., substantially) reduce, lower, or minimize quantization errors for the weights. Reducing or minimizing the quantization error can reduce or minimize degradation of accuracy, due to quantization of weights, with respect to the training of the model or system 110 (e.g., deep learning model or system). In some embodiments, the quantizer management component 108 can efficiently estimate or determine the desired quantization scale value $\alpha_w^*$ of the respective quantization scale values, to desirably reduce the quantization error of the weights, as a function of a first statistical function, $E(w^2)$, and a second statistical function, such as $E(|w|)$, wherein $E(w^2)$ can be the expected value (e.g., mean value or average value) of the squared values of the weight values (w) of the weight distribution for the set of weights, or portion thereof, and wherein can be the expected value (e.g., mean value or average value) of the absolute values of the weight values of the weight distribution for the set of weights, or portion thereof. For example, for the set of weights, or portion thereof, the quantizer management component 108 can estimate or determine the quantization scale value $\alpha_w^*$ of the respective quantization scale values as a function of a first statistical function, $\sqrt{E(w^2)}$, and a second statistical function, such as $E(|w|)$.

In other embodiments, for the set of weights, or portion thereof, the quantizer management component 108 can estimate or determine the quantization scale value $\alpha_w^*$ of the respective quantization scale values based at least in part on one or more other types of statistical functions, such as, for example, a standard deviation function or a variance function, wherein such standard deviation function or variance function can be respectively determined (e.g., by the quantizer management component 108) based at least in part on statistical data associated with the set of weights, or portion thereof.

In some embodiments, with regard to a subset of weights (e.g., all or a portion of a layer of weights of the set of weights), the quantizer management component 108 can determine a first coefficient value associated with a first statistical function and a second coefficient value associated with a second statistical function based at least in part on statistical data (e.g., measurement data) relating to quantizing weights and/or the weight distribution associated with the subset of weights, the type of statistical function that the first statistical function is, and the type of statistical function that the second statistical function is, in accordance with the defined quantization criteria.

For example, if the first statistical function is the square root of the expected value (e.g., the mean or average value) of the squared values of the weight values of the weights of the weight distribution for the subset of the weights, the quantizer management component 108 can determine the first coefficient value to be a particular value. However, if the first statistical function relates to a standard deviation value associated with the weight values of the weights of the weight distribution for the subset of the weights, the quantizer management component 108 can determine the first coefficient value to be a different value than the particular value.

As another example, if the second statistical function is the expected value (e.g., the mean or average value) of the absolute values of the weight values of the weights of the weight distribution for the subset of the weights, the quantizer management component 108 can determine the second coefficient value to be a specified value. However, if the second statistical function relates to a variance function value associated with the weights values of the weights of the weight distribution for the subset of the weights, the quantizer management component 108 can determine the second coefficient value to be a different value than the specified value.

The statistical data (e.g., measurement data) can comprise data relating to the weight distribution for the subset of weights and/or empirical data relating to quantizing weights, from which the first and second coefficient values can be derived or determined (e.g., by the quantizer management component 108 or another component). The statistical data can be data obtained prior to training a deep learning model or system and/or during training of the deep learning model or system, for example.

The reduced quantization error associated with the estimated quantization scale value can be substantially close to being the same as a minimum quantization error, in connection with quantizing the weights, wherein the minimum quantization error is associated a theoretical quantization scale value that can minimize the quantization error when utilized during the quantizing of the weights of the subset of weights. Accordingly, the estimated quantization scale value can be approximately the same as (e.g., can be within a defined value distance of) the theoretical quantization scale value, in accordance with the defined quantization criteria.

The quantizer component 106 can apply the estimated quantization scale value to the weights of the subset of weights (e.g., a layer of weights, or a portion of a layer of weights) to generate corresponding quantized weights. For instance, the quantizer component 106 can apply the desired estimated quantization scale value to the weights of each subset of weights (e.g., each layer of weights, or each portion of each layer of weights) to quantize each layer of weights in each minibatch of training of the model or system 110 (e.g., deep learning model or system) to generate corresponding quantized weights. As disclosed herein, the quantization error associated with quantizing the weights of the subset of weights can be a desirably lower amount of quantization error that can be substantially close to being the same as the minimum quantization error associated the theoretical quantization scale value and can be lower than all, or at least virtually all, of the other quantization errors associated with the other quantization scale values of the quantization scale.

With regard to training of the model or system 110 (e.g., deep learning model or system) and minibatches of training of the model or system 110, in the context of deep learning, when training of a model or system is performed, for example, with regard to image classification, every image in a dataset can be sent to the model or system 110 to train the model or system 110. When every image of the dataset has been sent to the model or system 110, that can be considered one epoch. An epoch can be comprised of many minibatches, wherein each minibatch can comprise 1, 2, 4, 8, 256, or virtually any other desired number of images, for example, in the case of a dataset comprising images. For example, if the dataset comprises 1000 images for training of the model or system 110, every time the 1000 images has been sent to the model or system 110 for training, that can be an epoch, wherein the 1000 images can be divided up, as desired. For instance, there can be a minibatch of 4 images of the 1000 images that can be sent at a time to train the model or system 110, wherein there can be 250 minibatches that can each comprise 4 images of the 1000 images, and it can take 250 minibatches to make up an epoch. The weight can be updated after each minibatch, wherein, for example, when a subset of data (e.g., 4 images) is sent for training of the model or system 110, the output generated from the sending (e.g., applying) of the subset of data to train the model or system 110 can be evaluated and statistics can be determined or computed based on the evaluation, and then the weight can be updated accordingly based on the statistics.

With respect to a dataset associated with training the model or system 110 (e.g., deep learning model or system), the quantizer management component 108 can determine respective estimated quantization scale values for respective subsets of weights (e.g., respective layers of weights or respective portions of the respective layers of weights of the set of weights) based at least in part on one or more respective statistical functions, in accordance with the defined quantization criteria, wherein the one or more respective statistical functions can be based at least in part on respective statistical data associated with or related to the respective subsets of weights. This can be performed by the quantizer management component 108, for example, until all or a desired portion of the estimated quantization scales values have been determined for all or a desired portion of the respective subsets of weights. The estimated quantization scale value for one subset of weights can be different from or same as the estimated quantization scale value for another subset of weights, depending in part on the respective statistics associated with the respective weight distributions of the respective subsets of weights, in accordance with the defined quantization criteria. The quantizer component 106 can apply the respective estimated quantization scale values to the respective subsets of weights to generate respective quantized weights for the respective subsets of weights.

In some embodiments, during training of a model or system 110, for example, the quantizer management component 108 can determine an initial estimated quantization scale value to apply to a subset of weights. The quantizer management component 108 can monitor the training of the model or system 110, including monitoring the performance of training the model or system 110 and/or quantizing of weights using the initial estimated quantization scale value. Based at least in part on the results of evaluating the performance of training the model or system 110 and/or the quantizing of weights using the initial estimated quantization scale value, the quantizer management component 108 can determine whether the initial estimated quantization scale value is suitable or whether it should be updated to a different (e.g., improved or refined) estimated quantization scale value, in accordance with the defined quantization criteria. For example, the quantizer management component 108 can determine one or more different coefficients to be utilized with one or more statistical functions, can determine a different estimated quantization scale value to apply in connection with quantizing weights based at least in part on the one or more different coefficients, and can perform an update to the new (e.g., different) estimated quantization scale value, which can be utilized by the quantizer component 106 to quantize weights. There can be zero, one, or more than one updated estimated quantization scale values determined or employed by the quantizer management component 108 and quantizer component 106 during the training of the model or system 110, in accordance with the defined quantization criteria.

One of the desirable qualities of the quantizer management component 108 determining or estimating a desirable quantization scale value to apply to a subset of weights of the set of weights to desirably reduce (e.g., substantially reduce or minimize) quantization error of the weights, based at least in part on statistical data (e.g., statistics associated with a weight distribution associated with the subset of weights) and determined statistical functions, can be that the quantizer management component 108 can determine such desirable quantization scale value in a single determination, without trial and error, without having to use brute force, and without having to perform multiple iterations in order to determine such desirable quantization scale value. This can make the determining or estimating of a desirable quantization scale value a more efficient process and can make the process of training a model of system 110 (e.g., deep learning model or system) more efficient (e.g., better performing, less time consuming and less overhead for quantizing and training).

Figure 3:
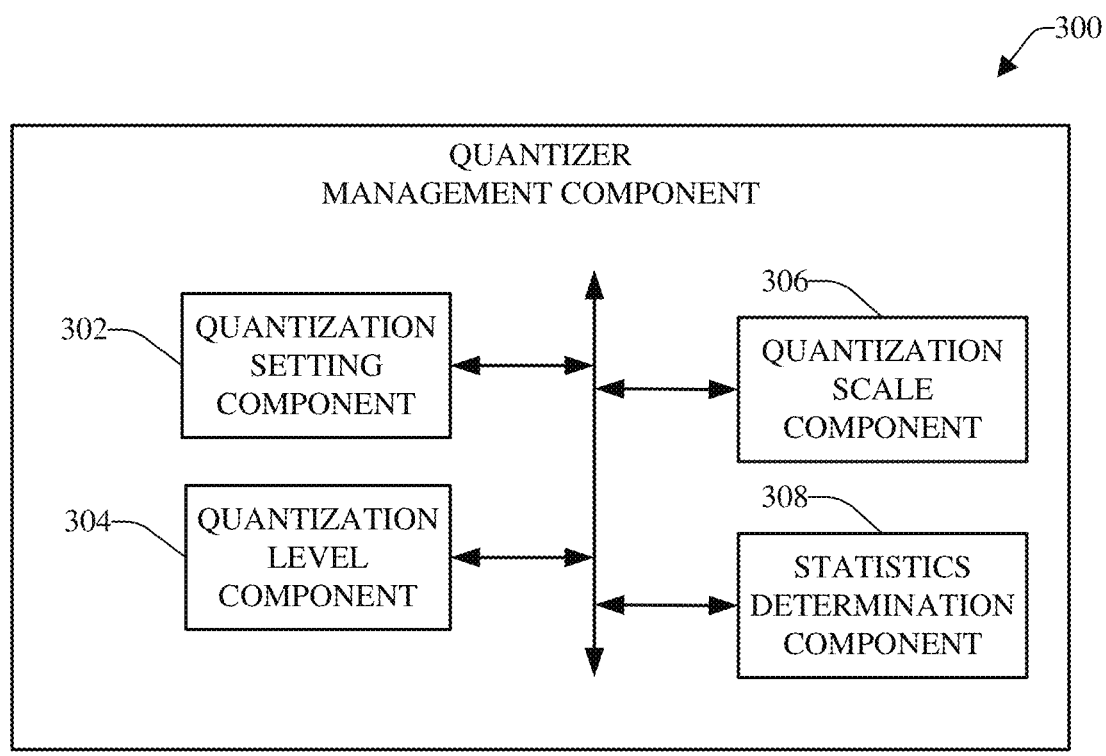
FIG. 3 presents a block diagram of an example, non-limiting quantizer management component, in accordance with various aspects and embodiments of the disclosed subject matter.

Referring to FIG. 3, FIG. 3 presents a block diagram of an example quantizer management component 300, in accordance with various aspects and embodiments of the disclosed subject matter. The quantizer management component 300 can comprise a quantization setting component 302, a quantization level component 304, a quantization scale component 306, and a statistics determination component 308.

The quantization setting component 302 can be employed to set or select various parameters relating to quantization. For instance, the quantization setting component 302 can set or select quantization to be symmetric and/or uniform, or neither symmetric or uniform, based at least in part on user input information, a type of application or model (e.g., a type of deep learning application or model) associated with the weight quantization, a type of weight distribution (e.g., Gaussian, Uniform, Laplace, . . . ) for weights that are to be quantized, and/or another type of quantization criterion. The quantization setting component 302 also can set or select parameters relating to rounding of values and/or value offsets based at least in part on user input information, a type of application or model associated with the weight quantization, a type of weight distribution for weights that are to be quantized, and/or another type of quantization criterion. For example, the quantization setting component 302 can set or select a rounding parameter to employ nearest rounding or another desired rounding technique during quantization of weights, and/or can set or select an offset parameter to apply an offset value (e.g., a positive or negative bias) to an intermediate quantized value to produce a quantized value (e.g., which can be rounded to a final quantized value using nearest rounding or another desired rounding technique, when nearest rounding or the other desired rounding technique is employed).

The quantization level component 304 can determine or select a desired number of quantization levels to apply for a set of weights, or portion thereof, for a dataset, in accordance with the defined quantization criteria. For instance, the quantization level component 304 can determine or select a desired number of quantization levels to apply for a set of weights, or portion thereof, for a dataset, based at least in part on user input information, a type of application or model associated with the weight quantization, a type of weight distribution for weights that are to be quantized, and/or another type of quantization criterion. The number of quantization levels can be, for example, 2, 3, 4, 8, 16, 32, or another desired number of quantization levels.

The quantization scale component 306 can be utilized to determine a desirable (e.g., suitable or optimal) quantization scale based at least in part on a bit precision level or quantization level for a set of weights, or portion thereof. For a given subset of weights of a set of weights associated with a dataset, in connection with training of or an inference(s) associated with a model or system (e.g., deep learning model or system), the quantization scale component 306 also can determine or estimate a desirable quantization scale value (e.g., suitable or optimal) of the quantization scale values associated with the quantization scale, based at least in part on one or more statistical functions, in accordance with the defined quantization criteria, as more fully described herein. The desirable quantization scale value can be utilized to desirably reduce (e.g., significantly reduce or minimize) the quantization error of weights, as more fully described herein. For a given subset of weights, during training of a model or system (e.g., deep learning model or system), at another desired time, or under (e.g., in response to) a particular set of circumstances or conditions, the quantization scale component 306 also can update (e.g., automatically or dynamically update) quantization scale values, coefficient values used for determining a quantization scale value, a statistical function utilized to facilitate determining or estimating a desirable quantization scale value, and/or other parameters associated with determining or estimating a desirable quantization scale value, in accordance with the defined quantization criteria.

The statistics determination component 308 can be employed to determine or calculate statistics (e.g., statistical data and/or statistical functions) relating to weight distributions for a set of weights associated with a dataset in connection with a model or system (e.g., in connection with training of a deep learning model or system), in accordance with the defined quantization criteria. For instance, with regard to a subset of weights (e.g., a layer of weights, or a portion of a layer of weights of the set of weights), the statistics determination component 308 can analyze the weight distribution associated with the subset of weights. Based at least in part on the results of the analysis, the statistics determination component 308 can determine or calculate statistics relating to the weight distribution, including determining one or more statistical functions to be used to determine a desirable quantization scale value for use with respect to the subset of weights, determining coefficients associated with the one or more statistical functions, determining or estimating the relationship between desirable (e.g., suitable or optimal, or at least substantially optimal) quantized weight values for un-quantized weight values with respect to statistical characteristics of the weight distribution. The statistics relating to the weight distribution can be utilized by (e.g., used, analyzed, and/or evaluated by) the quantization scale component 306 to determine the desirable quantization scale value for the subset of weights.

Figure 4:
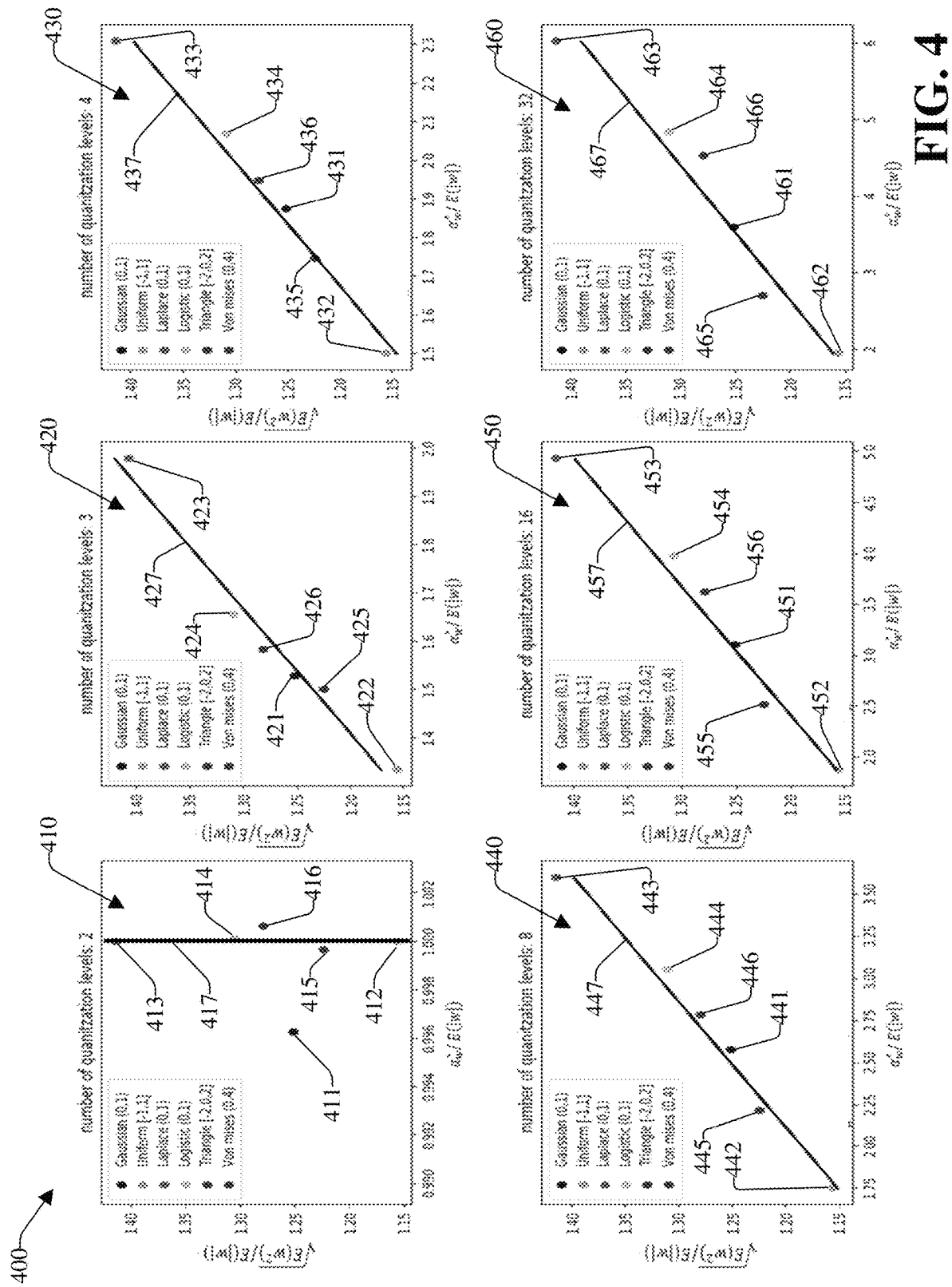
FIG. 4 depicts diagrams of example graphs of simulation results that can facilitate determining functions (e.g., statistical functions) or equations empirically that can be used to estimate a quantization scale value for various types of weight distributions, in accordance with various aspects and embodiments of the disclosed subject matter.

Referring to FIG. 4, FIG. 4 depicts diagrams of example graphs 400 of simulation results that can facilitate determining functions (e.g., statistical functions) or equations empirically that can be used to estimate a quantization scale value for various types of weight distributions, in accordance with various aspects and embodiments of the disclosed subject matter. The graphs 400 can illustrate respective simulation results for respective quantization levels. The graphs 400 respectively plot $\sqrt{E(w^2)}/E(|w|)$ on the y-axis with respect to (e.g., versus) $\alpha_w^*/E(|w|)$ along the x-axis for different quantization levels (e.g., 2, 3, 4, 8, 16, and 32 quantization levels) for different types of weight distributions, including Gaussian, uniform, Laplace, logistic, triangle, and von Mises.

As can be observed in the graphs 400, given a bit precision $n_{bin}$, which can correspond to a quantization level, $\alpha_w^*$ can be derived (e.g., by the quantizer management component 108 or another component) as a linear function of $\sqrt{E(w^2)}$ and $E(|w|)$. The quantizer management component 108 and quantizer component 106 can utilize the empirical functions to determine or estimate the desired quantization scale value to facilitate quantization of weights during training of a model or system 110 (e.g., deep learning model or system) or with respect to the model or system 110 producing inferences.

The graphs 400 can include graph 410 that can comprise simulation results for a quantization level of 2 with respect to various types of weight distributions (e.g., Gaussian (411), uniform (412), Laplace (413), logistic (414), triangle (415), and von Mises (416)). From the data relating to the various types of weight distributions as presented in the graph 410, an empirical function for the quantization level of 2 can be derived (e.g., by the quantizer management component 108 or another component) as $\alpha_w^*=E(|w|)$, as indicated at reference numeral 417.

The graphs 400 also can comprise graph 420 that can include simulation results for a quantization level of 3 with respect to the various types of weight distributions (e.g., Gaussian (421), uniform (422), Laplace (423), logistic (424), triangle (425), and von Mises (426)). From the data relating to the various types of weight distributions as presented in the graph 420, an empirical function with respect to the quantization level of 3 can be derived (e.g., by the quantizer management component 108 or another component) as $\alpha_w^*=2.587\cdot\sqrt{E(w^2)}-1.693\cdot E(|w|)$, as indicated at reference numeral 427. This $\alpha_w^*$ can be viewed as comprising a first statistical function based on $\sqrt{E(w^2)}$ and having a first coefficient of 2.587 and a second statistical function based on $E(|w|)$ and having a second coefficient of -1.693.

The graphs 400 further can comprise graph 430 that can include simulation results for a quantization level of 4 with respect to the various types of weight distributions (e.g., Gaussian (431), uniform (432), Laplace (433), logistic (434), triangle (435), and von Mises (436)). Based at least in part on the data relating to the various types of weight distributions as presented in the graph 430, an empirical function with respect to the quantization level of 4 can be derived (e.g., by the quantizer management component 108 or another component) as $\alpha_w^*=3.212\cdot\sqrt{E(w^2)}-2.178\cdot E(|w|)$, as indicated at reference numeral 437. This $\alpha_w^*$ can be viewed as comprising a first statistical function based on $\sqrt{E(w^2)}$ and having a first coefficient of 3.212 and a second statistical function based on $E(|w|)$ and having a second coefficient of -2.178.

The graphs 400 also can include graph 440 that can comprise simulation results for a quantization level of 8 with respect to the various types of weight distributions (e.g., Gaussian (441), uniform (442), Laplace (443), logistic (444), triangle (445), and von Mises (446)). Based at least in part on the data relating to the various types of weight distributions as presented in the graph 440, an empirical function with respect to the quantization level of 8 can be derived (e.g., by the quantizer management component 108 or another component) as $\alpha_w^*=7.509\cdot\sqrt{E(w^2)}-6.892\cdot E(|w|)$, as indicated at reference numeral 447. This $\alpha_w^*$ can be viewed as comprising a first statistical function based on $\sqrt{E(w^2)}$ and having a first coefficient of 7.509 and a second statistical function based on $E(|w|)$ and having a second coefficient of -6.892.

The graphs 400 also can include graph 450 that can comprise simulation results for a quantization level of 16 with respect to the various types of weight distributions (e.g., Gaussian (451), uniform (452), Laplace (453), logistic (454), triangle (455), and von Mises (456)). Based at least in part on the data relating to the various types of weight distributions as presented in the graph 450, an empirical function for the quantization level of 16 can be derived (e.g., by the quantizer management component 108 or another component) as $\alpha_w^*=12.68\cdot\sqrt{E(w^2)}-12.80\cdot E(|w|)$, as indicated at reference numeral 457. This $\alpha_w^*$ can be viewed as comprising a first statistical function based on $\sqrt{E(w^2)}$ and having a first coefficient of 12.68 and a second statistical function based on $E(|w|)$ and having a second coefficient of -12.80.

The graphs 400 also can comprise graph 460 that can include simulation results for a quantization level of 32 with respect to the various types of weight distributions (e.g., Gaussian (461), uniform (462), Laplace (463), logistic (464), triangle (465), and von Mises (466)). Based at least in part on the data relating to the various types of weight distributions as presented in the graph 460, an empirical function for the quantization level of 32 can be derived (e.g., by the quantizer management component 108 or another component) as $\alpha_w^*=17.74\cdot\sqrt{E(w^2)}-18.64\cdot E(|w|)$, as indicated at reference numeral 467. This $\alpha_w^*$ can be viewed as comprising a first statistical function based on $\sqrt{E(w^2)}$ and having a first coefficient of 17.74 and a second statistical function based on $E(|w|)$ and having a second coefficient of -18.64.

It is to be appreciated and understood that the respective equations for estimating $\alpha_w^*$, and the respective statistical functions and respective coefficients associated with the respective equations, for the respective quantization levels in the graphs 400 are example equations, example statistical functions, and example coefficients, and different equations for estimating $\alpha_w^*$, different statistical functions, and/or different coefficients can be derived (e.g., by the quantizer management component 108 or another component) based at least in part on particular weight distributions, the particular types of weight distributions, and/or other factors.

Figure 5:
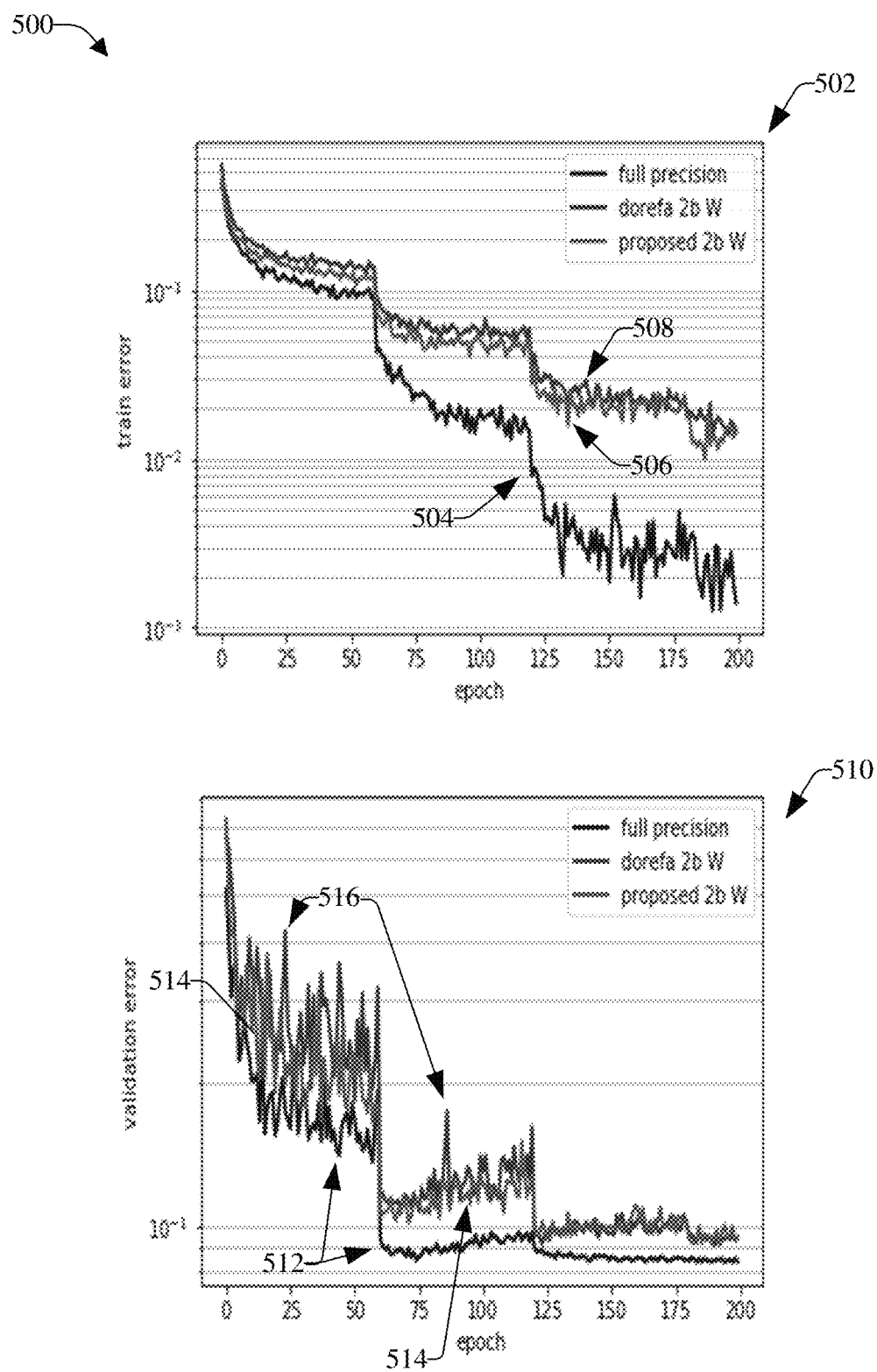
FIG. 5 illustrates diagrams of example graphs of experimental results for a first example weight quantization, in accordance with various aspects and embodiments of the disclosed subject matter.
Figure 6:
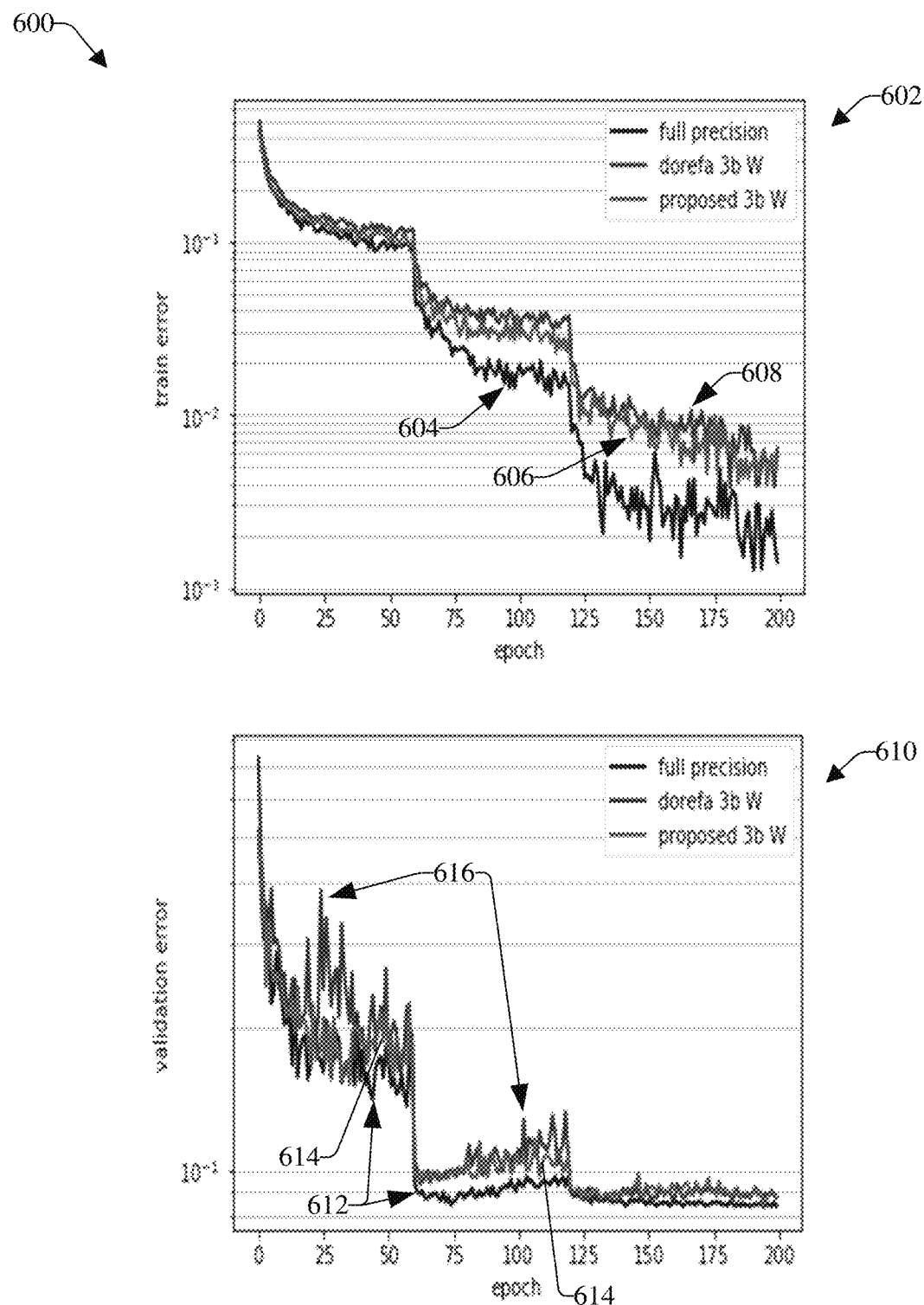
FIG. 6 depicts diagrams of example graphs of experimental results for a second example weight quantization, in accordance with various aspects and embodiments of the disclosed subject matter.
Figure 7:
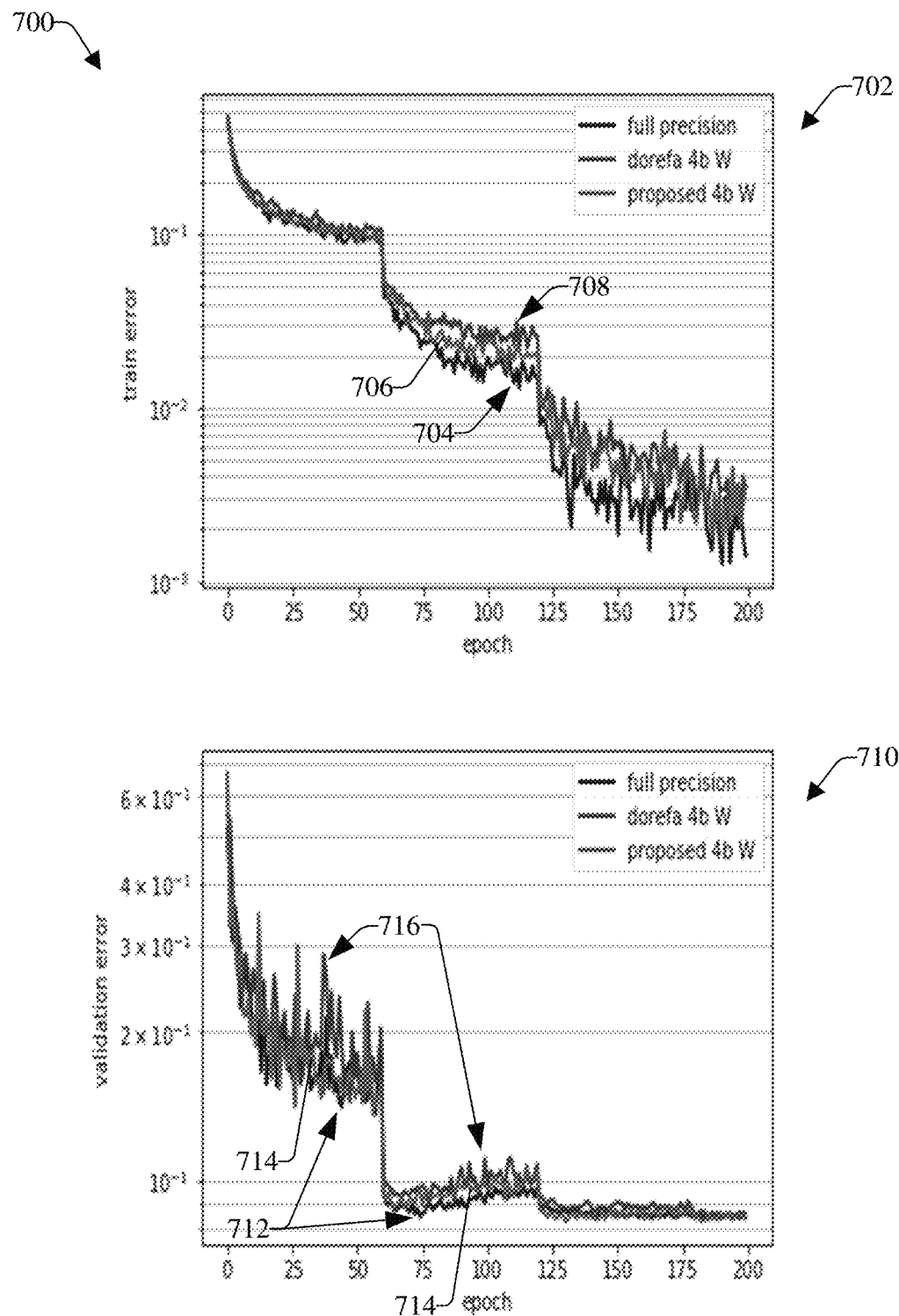
FIG. 7 illustrates diagrams of example graphs of experimental results for a third example weight quantization, in accordance with various aspects and embodiments of the disclosed subject matter.

FIGS. 5-7 present respective experimental results comparing the training errors and testing errors at respective weight quantizations for respective types of implementations (e.g., DoReFa Net implementation, the disclosed techniques for determining or estimating a desired quantization scale value for weight quantization, and a full precision implementation). The weight quantizations used for the experiments comprise the following:

$\alpha_w^*=3.212\cdot\sqrt{E(w^2)}-2.178\cdot E(|w|);$      2b:

$\alpha_w^*=7.509\cdot\sqrt{E(w^2)}-6.892\cdot E(|w|);$ and      3b:

$\alpha_w^*=12.68\cdot\sqrt{E(w^2)}-12.80\cdot E(|w|).$      4b:

The experiments involved CIFAR10 ResNet. There was 2-4 bit quantization of weights, activation, and gradients in full precision. The disclosed subject matter (e.g., the disclosed techniques for determining or estimating a desired quantization scale value for weight quantization) can be compared to the DoReFa Net implementation with the same bit precision of weight quantization, activation, and gradients in full precision.

The experimental results of the respective training errors and test errors for the 2b weight, 3b weight, and 4b weight, for the DoReFa implementation, the disclosed techniques (also referred to as proposed), and the full precision (full prec) implementation are presented in TABLE 1 as follows:

TABLE 1

|  | 2b weight | | 3b weight | | 4b weight | |
| --- | --- | --- | --- | --- | --- | --- |
|  | Train error | Test error | Train error | Test error | Train error | Test error |
| DoReFa | 1.36% | 9.12% | 0.38% | 8.64% | 0.23% | 8.37% |
| proposed | 0.99% | 9.12% | 0.23% | 8.46% | 0.16% | 8.27% |
| full prec | 0.13% | 8.37% | 0.13% | 8.37% | 0.13% | 8.37% |

FIG. 5 illustrates diagrams of example graphs 500 of experimental results for a first example (e.g., 2b) weight quantization, in accordance with various aspects and embodiments of the disclosed subject matter. The graphs 500 comprise graph 502 that plots the training error on the y-axis with respect to the training epoch along the x-axis with respect to the example 2b weight quantization using $\alpha_w^* = 3.212 \cdot \sqrt{E(w^2)} - 2.178 \cdot E(|w|)$. As can be observed, the graph 502 presents the experimental training error results 504 for full precision, the experimental training error results 506 for the disclosed (e.g., proposed) techniques, and the experimental training error results 508 for the DoReFa Net implementation.

The graphs 500 also include graph 510 that plots the validation error (e.g., testing error) on the y-axis with respect to the training epoch along the x-axis with respect to the example 2b weight quantization using $\alpha_w^* = 3.212 \cdot \sqrt{E(w^2)} - 2.178 \cdot E(|w|)$. As can be seen in the graph 510, the graph 510 presents the experimental validation error results 512 for full precision, the experimental validation error results 514 for the disclosed (e.g., proposed) techniques, and the experimental validation error results 516 for the DoReFa Net implementation.

With regard to FIG. 6, FIG. 6 depicts diagrams of example graphs 600 of experimental results for a second example (e.g., 3b) weight quantization, in accordance with various aspects and embodiments of the disclosed subject matter. The graphs 600 can include graph 602 that plots the training error on the y-axis with respect to the training epoch along the x-axis with respect to the example 3b weight quantization using $\alpha_w^* = 7.509 \cdot \sqrt{E(w^2)} - 6.892 \cdot E(|w|)$. As can be seen in the graph 602, the graph 602 presents the experimental training error results 604 for full precision, the experimental training error results 606 for the disclosed (e.g., proposed) techniques, and the experimental training error results 608 for the DoReFa Net implementation.

The graphs 600 also comprise graph 610 that plots the validation error (e.g., testing error) on the y-axis with respect to the training epoch along the x-axis with respect to the example 3b weight quantization using $\alpha_w^* = 7.509 \cdot \sqrt{E(w^2)} - 6.892 \cdot E(|w|)$. The graph 610 presents the experimental validation error results 612 for full precision, the experimental validation error results 614 for the disclosed (e.g., proposed) techniques, and the experimental validation error results 616 for the DoReFa Net implementation.

Turning briefly to FIG. 7, FIG. 7 illustrates diagrams of example graphs 700 of experimental results for a third example (e.g., 4b) weight quantization, in accordance with various aspects and embodiments of the disclosed subject matter. The graphs 700 can comprise graph 702 that plots the training error on the y-axis with respect to the training epoch along the x-axis with respect to the example 4b weight quantization using $\alpha_w^* = 12.68 \cdot \sqrt{E(w^2)} - 12.80 \cdot E(|w|)$. As can be observed, the graph 702 presents the experimental training error results 704 for full precision, the experimental training error results 706 for the disclosed (e.g., proposed) techniques, and the experimental training error results 708 for the DoReFa Net implementation.

The graphs 700 also comprise graph 710 that plots the validation error (e.g., testing error) on the y-axis with respect to the training epoch along the x-axis with respect to the example 4b weight quantization using $\alpha_w^* = 12.68 \cdot \sqrt{E(w^2)} - 12.80 \cdot E(|w|)$. As can be seen, the graph 710 presents the experimental validation error results 712 for full precision, the experimental validation error results 714 for the disclosed (e.g., proposed) techniques, and the experimental validation error results 716 for the DoReFa Net implementation.

As can be observed from the respective graphs in FIGS. 5-7, including the respective experimental results, the techniques disclosed herein for estimating desirable (e.g., optimal or suitable) quantization scale values for use to facilitate quantizing weights for datasets can perform quite favorably, as compared to the DoReFa implementation and the full precision implementation. Further, the techniques disclosed herein for estimating the desirable quantization scale values can achieve desirably low quantization errors in connection with quantizing weights while also enabling more efficient quantization of weights for datasets, as the amount of time and resources expended for quantizing weights can be reduced.

Figure 8:
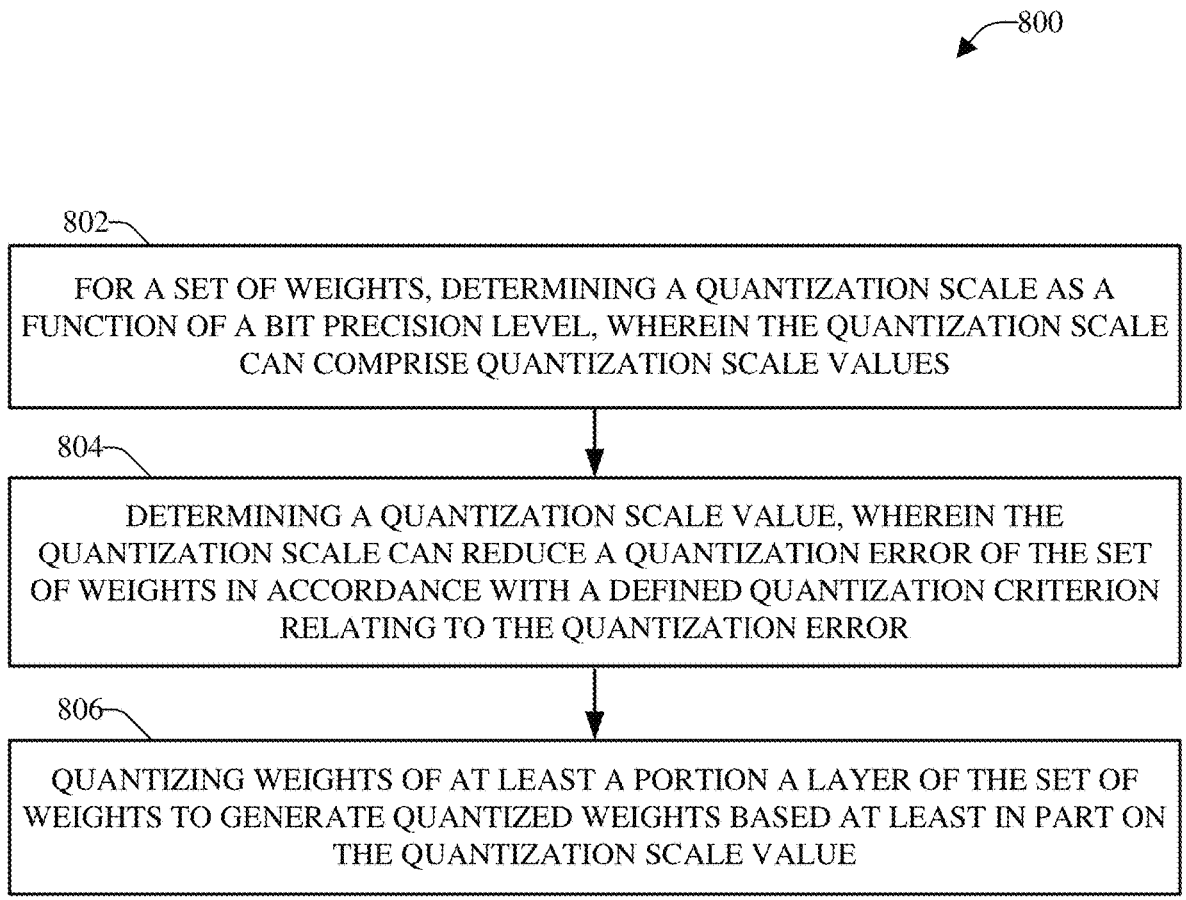
FIG. 8 illustrates a flow diagram of an example, non-limiting method for determining a quantization scale value to use to quantize weights to facilitate reducing (e.g., minimizing or at least substantially minimizing) quantization error in connection with quantizing weights, in accordance with various aspects and embodiments of the disclosed subject matter.

FIG. 8 illustrates a flow diagram of an example, non-limiting method 800 for determining a quantization scale value to use to quantize weights to facilitate reducing (e.g., minimizing or at least substantially minimizing) quantization error in connection with quantizing weights, in accordance with various aspects and embodiments of the disclosed subject matter. The method 800 can be performed by, for example, the processor component, the quantizer management component, and/or the quantizer component. Repetitive description of like elements employed in other embodiments described herein is or may be omitted for sake of brevity.

At 802, for a set of weights, a quantization scale can be determined as a function of a bit precision level, wherein the quantization scale can comprise quantization scale values. The quantizer management component can determine the quantization scale as a function of the bit precision level.

At 804, a quantization scale value can be determined, wherein the quantization scale can reduce a quantization error of the set of weights in accordance with a defined quantization criterion relating to the quantization error. The quantizer management component can determine and select the quantization scale value, of the quantization scale values associated with the quantization scale, that can reduce the quantization error for the set of weights in accordance with the defined quantization criterion relating to the quantization error. For example, the quantizer management component can determine or estimate the quantization scale value, of the quantization scale values, that can better reduce (e.g., minimize or at least substantially minimize) the quantization error with regard to weights of the set of weights than all, or at least almost all, of the other quantization scale values associated with the quantization scale.

At 806, weights of at least a portion of a layer of the set of weights can be quantized to generate quantized weights based at least in part on the quantization scale value. The quantizer component can quantize weights of at least a portion of a layer of the set of weights to generate quantized weights based at least in part on the quantization scale value. In some embodiments, based at least in part on the quantization scale value, the quantizer component can quantize weights of an entire layer of the set of weights to generate the quantized weights with respect to that layer.

In other embodiments, in accordance with the method 800 and as otherwise described herein, the quantizer management component can determine or estimate respective desired (e.g., optimal or suitable) quantization scale values that can reduce respective quantization errors for respective portions (e.g., respective subsets of weights) of a layer of the set of weights in accordance with the defined quantization criterion relating to the quantization error. Based at least in part on the respective quantization scale values, the quantizer component can quantize respective subsets of weights of the respective portions of the layer to generate respective quantized weights.

Figure 9:
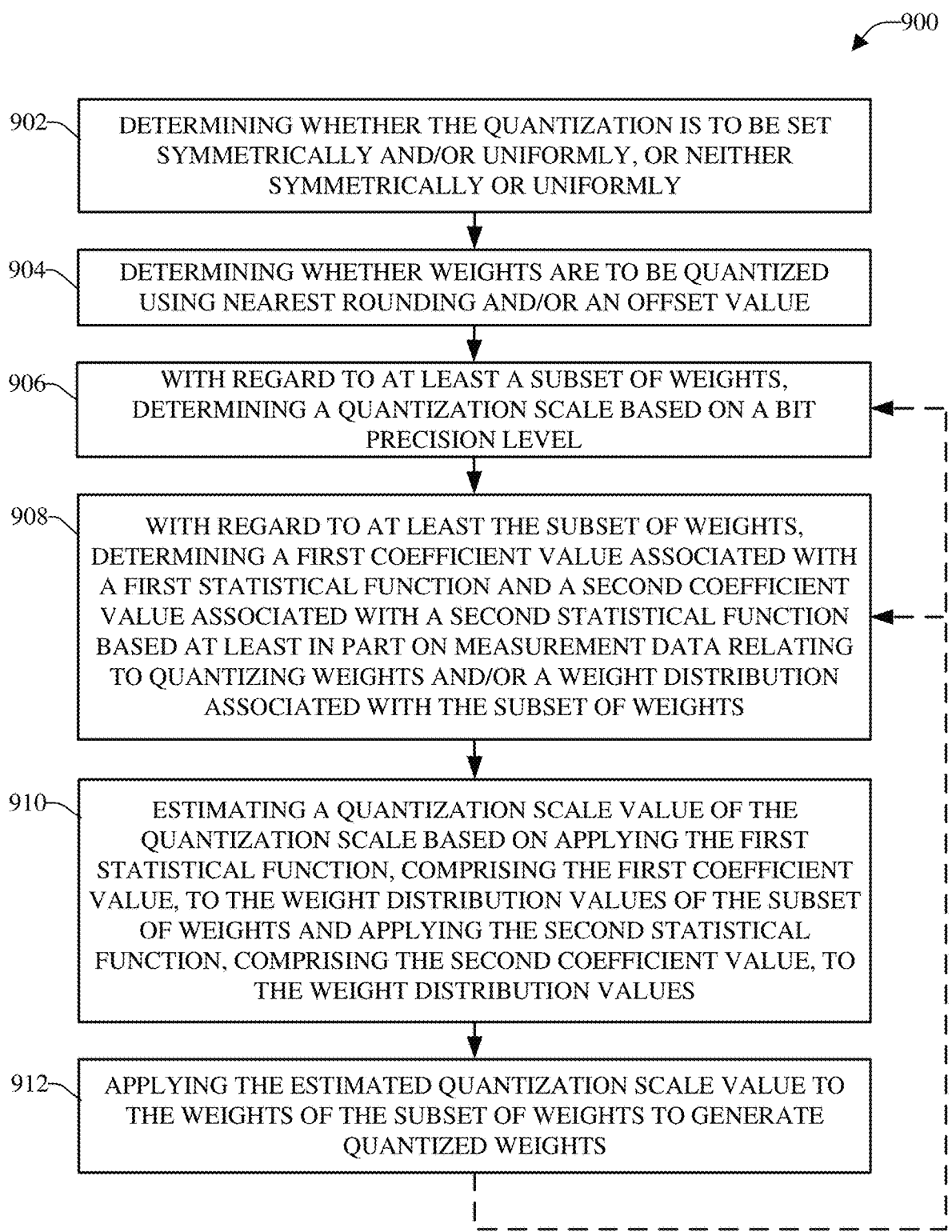
FIG. 9 depicts a flow diagram of another example, non-limiting method for determining quantization scale values to use to quantize weights to facilitate reducing (e.g., minimizing or at least substantially minimizing) quantization error in connection with quantizing weights, in accordance with various aspects and embodiments of the disclosed subject matter.

FIG. 9 depicts a flow diagram of another example, non-limiting method 900 for determining quantization scale values to use to quantize weights to facilitate reducing (e g, minimizing or at least substantially minimizing) quantization error in connection with quantizing weights, in accordance with various aspects and embodiments of the disclosed subject matter. The method 900 can be performed by, for example, the processor component, the quantizer management component, and/or the quantizer component. Repetitive description of like elements employed in other embodiments described herein is or may be omitted for sake of brevity.

At 902, a determination can be made regarding whether the quantization is to be set symmetrically and/or uniformly, or neither symmetrically or uniformly. The quantizer management component can determine whether the quantization is to be set symmetrically and/or uniformly, or is to be set neither symmetrically and/or uniformly. The quantizer management component can make such a determination based at least in part on user input information (e.g., the user can input information to select quantization to be set symmetrically and/or uniformly, or neither symmetrically or uniformly), a type of application or model (e.g., a particular type of deep learning application or model) associated with the weight quantization, a type of weight distribution (e.g., Gaussian, Uniform, Laplace, . . . ) for weights to be quantized, and/or another type of quantization criterion.

At 904, a determination can be made regarding whether weights are to be quantized using nearest rounding and/or an offset value. The quantizer management component can determine whether the weights are to be quantized using nearest rounding of quantized weights (e.g., quantized weight values) and/or an offset value (e.g., a positive or negative bias or offset value) that can be applied to an intermediate quantized weight to facilitate generating the quantized weight (e.g., after rounding the combined value of the intermediate quantized weight and the offset value to the nearest quantized value). The quantizer management component can make such determination regarding whether to use nearest rounding and/or the offset value based at least in part on user input information (e.g., input information from the user to select nearest rounding and/or the offset value), a type of application or model associated with the weight quantization, a type of weight distribution for weights to be quantized, and/or another type of quantization criterion. It is to be appreciated and understood that, while reference numeral 904 of the method 900 describes determining whether weights are to be quantized using nearest rounding and/or the offset value, the disclosed subject matter is not so limited, and, in accordance with various other embodiments, the method 900, at reference numeral 904, can comprise determining whether the weights are to be quantized using nearest rounding or another desired rounding technique, as more fully described herein, and/or the offset value.

At 906, with regard to at least a subset of weights of a set of weights, a quantization scale can be determined based at least in part on a bit precision level. The quantizer management component can determine the quantization scale to utilize for quantizing weights for at least the subset of weights based at least in part on the bit precision level. The subset of weights can be all or a portion of a layer of weights of the set of weights, for example. The bit precision level can correspond to (e.g., be determined based at least in part on) the bin number (e.g., the number of bins), wherein the bin number can correspond to (e.g., be determined based at least in part on) the number of quantization levels (e.g., 2 levels, 3 levels, 4 levels, 8 levels, 16 levels, 32 levels, or another desired quantization level). The quantizer management component can determine the bit precision level based at least in part on user input information (e.g., input information from the user to select the bit precision level), a type of application or model associated with the weight quantization, a type of weight distribution for weights to be quantized, and/or another type of quantization criterion.

At 908, with regard to at least the subset of weights, a first coefficient value associated with a first statistical function and a second coefficient value associated with a second statistical function can be determined based at least in part on measurement data relating to quantizing weights and/or a weight distribution associated with the subset of weights. With regard to at least the subset of weights (e.g., all or a portion of a layer of weights), the quantizer management component can determine the first coefficient value associated with the first statistical function and the second coefficient value associated with the second statistical function based at least in part on the measurement data relating to quantizing weights and/or the weight distribution associated with the subset of weights, in accordance with the defined quantization criteria. The first coefficient value also can be determined based at least in part on the type of statistical function that the first statistical function is, and the second coefficient value can be determined based at least in part on the type of statistical function that the second statistical function is.

For example, if the first statistical function is the square root of the expected value (e.g., the mean or average) of the square of the weight distribution values for the subset of the weights, the quantizer management component can determine the first coefficient value to be a particular value. However, if the first statistical function relates to a standard deviation value associated with the weight distribution values for the subset of the weights, the quantizer management component can determine the first coefficient value to be a different value than the particular value.

As another example, if the second statistical function is the expected value (e.g., the mean or average) of the absolute values of the weight distribution values for the subset of the weights, the quantizer management component can determine the second coefficient value to be a specified value. However, if the second statistical function relates to a variance function value associated with the weight distribution values for the subset of the weights, the quantizer management component can determine the second coefficient value to be a different value than the specified value.

The measurement data can comprise empirical data relating to quantizing weights from which the first and second coefficient values can be derived or determined (e.g., by the quantizer management component or another component). The measurement data can be data obtained prior to training a deep learning model or system and/or during training of the deep learning model or system, for example.

At 910, a quantization scale value of quantization scale values of the quantization scale can be estimated based at least in part on applying the first statistical function, comprising the first coefficient value, to the weight distribution values of the subset of weights and applying the second statistical function, comprising the second coefficient value, to the weight distribution values. The quantizer management component can estimate the quantization scale value of the quantization scale values of the quantization scale based at least in part on applying the first statistical function, comprising the first coefficient value, to the weight distribution values and applying the second statistical function, comprising the second coefficient value, to the weight distribution values.

The estimated quantization scale value can be a desired (e.g., optimal or suitable) quantization scale value that, when utilized in connection with quantizing the weights of the subset of weights, can result in a substantially reduced (e.g., lower) quantization error that can be lower than all, or at least almost all, of the other quantization errors that can be associated with other quantization scale values of the quantization scale values (e.g., if such other quantization scale values had been used for quantizing the weights). The substantially reduced quantization error associated with the estimated quantization scale value can be substantially close to being the same as a minimum quantization error, in connection with quantizing the weights, wherein the minimum quantization error is associated a theoretical quantization scale value that can minimize the quantization error when utilized during the quantizing of the weights of the subset of weights. Accordingly, the estimated quantization scale value can be approximately the same as (e.g., can be within a defined value distance of) the theoretical quantization scale value, in accordance with the defined quantization criteria.

As more fully described herein, the first and second coefficients, and accordingly, the estimated quantization scale value can be updated (e.g., automatically or dynamically updated), for example, during training of the deep learning model or system, at another desired time, or under (e.g., in response to) a particular set of circumstances or conditions.

At 912, the estimated quantization scale value can be applied to the weights of the subset of weights to generate quantized weights. The quantizer component can apply the estimated quantization scale value to the weights of the subset of weights to generate corresponding quantized weights. As stated, the quantization error associated with quantizing the weights can be a desirably lower amount of quantization error that can be substantially close to being the same as the minimum quantization error associated the theoretical quantization scale value and can be lower than all, or at least almost all, of the other quantization errors associated with the other quantization scale values.

In some embodiments, the method 900 can proceed from this point to return to reference numeral 906 or reference numeral 908, with regard to another subset of weights of the set of weights (if there is another subset of weights), wherein the other subset of weights can comprise weights of another portion of the layer (e.g., if the subset of weights comprised only a portion of the weights of the layer) or can comprise weights of another layer of weights of the set of weights. The method 900 can continue, for example, until all of the weights of the set of weights have been quantized to generate corresponding quantized weights.

For simplicity of explanation, the methods and/or computer-implemented methods are depicted and described as a series of acts. It is to be understood and appreciated that the disclosed subject matter is not limited by the acts illustrated and/or by the order of acts, for example acts can occur in various orders and/or concurrently, and with other acts not presented and described herein. Furthermore, not all illustrated acts can be required to implement the computer-implemented methods in accordance with the disclosed subject matter. In addition, those skilled in the art will understand and appreciate that the computer-implemented methods could alternatively be represented as a series of interrelated states via a state diagram or events. Additionally, it should be further appreciated that the computer-implemented methods disclosed hereinafter and throughout this specification are capable of being stored on an article of manufacture to facilitate transporting and transferring such computer-implemented methods to computers. The term article of manufacture, as used herein, is intended to encompass a computer program accessible from any computer-readable device or storage media.

Figure 10:
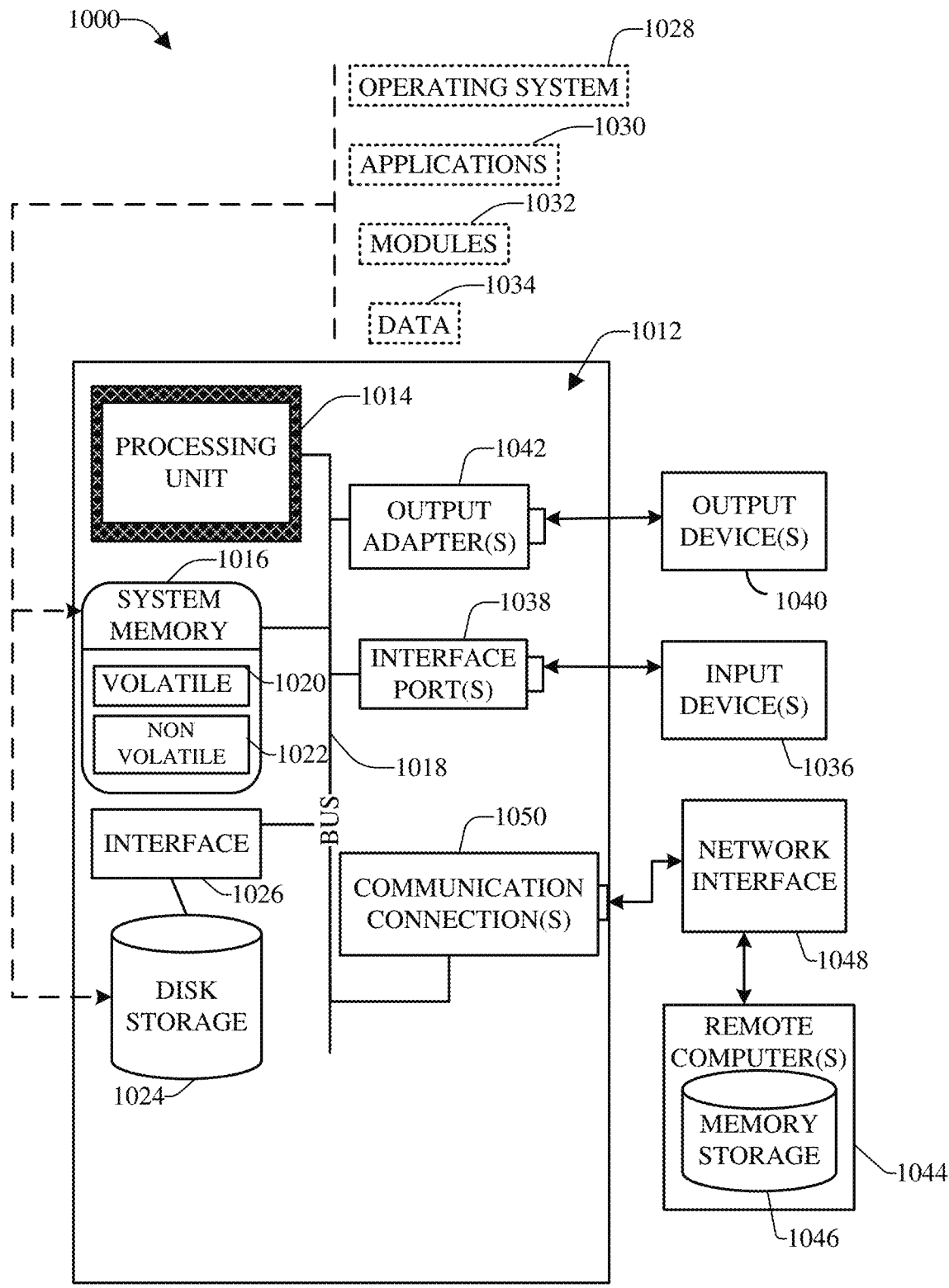
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is or may be omitted for sake of brevity. With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a method of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

One or more embodiments may be a system, a method, an apparatus and/or a computer program product at any possible technical detail level of integration. The computer program product can include a computer readable storage medium (or media) having computer readable program instructions thereon for causing a processor to carry out aspects of the one or more embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the disclosed subject matter can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the disclosed subject matter.

Aspects of disclosed subject matter are described herein with reference to flowchart illustrations and/or block diagrams of methods, apparatus (systems), and computer program products according to embodiments of the subject disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create method for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the disclosed subject matter. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can be implemented in combination with other program modules. Generally, program modules include routines, programs, components, data structures, etc. that perform particular tasks and/or implement particular abstract data types. Moreover, those skilled in the art will appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   for a set of weights, determining, by a system operatively coupled to a processor, a quantization scale as a function of a bit precision level, wherein the quantization scale comprises quantization scale values;
   determining, by the system, a quantization scale value that reduces a quantization error of the set of weights in accordance with a defined quantization criterion relating to the quantization error and an offset value based on a type of weight distribution of the set of weights;
   quantizing, by the system, weights of at least a portion of a layer of the set of weights to generate quantized weights based on the quantization scale value and the offset value; and
   applying, by the system, the quantization scale value to generate the quantized weights in one or more mini-batches to facilitate training a deep learning system or producing an inference by the deep learning system.

2. The computer-implemented method of claim 1, wherein the quantizing the weights further comprises, for the bit precision level, at least one of symmetrically or uniformly quantizing the weights to generate the quantized weights based on the quantization scale value, and wherein rounding is utilized to generate the quantized weights.

3. The computer-implemented method of claim 1, wherein the determining the quantization scale value comprises estimating the quantization scale value to apply to a weight of the set of weights as a linear or a non-linear function of a first statistical function of a weight value of the weight and a linear or non-linear function of a second statistical function of the weight value, and wherein the second statistical function is different from the first statistical function.

4. The computer-implemented method of claim 3, further comprising:
 determining, by the system, a first coefficient value associated with the first statistical function based on measurement data relating to weight quantization; and
 determining, by the system, a second coefficient value associated with the second statistical function based on the measurement data.

5. The computer-implemented method of claim 4, further comprising:
 updating, by the system, at least one of the first coefficient value or the second coefficient value to generate at least one of a third coefficient value associated with the first statistical function or a fourth coefficient value associated with the second statistical function based on additional measurement data relating to the weight quantization.

6. The computer-implemented method of claim 1, wherein the quantization scale value is associated with a quantization error within a defined value distance of a minimum quantization error.

7. The computer-implemented method of claim 1, wherein the determining the quantization scale value comprises estimating the quantization scale value based on the defined quantization criterion, wherein, in accordance with the defined quantization criterion, the quantization scale value is within a defined value distance of a quantization scale value that is able to minimize the quantization error associated with quantizing the weights.

8. The computer-implemented method of claim 6, further comprising:
 reducing, by the system, a bit precision of the weights of the set of weights based on the applying of the quantization scale value.

9. The computer-implemented method of claim 6, further comprising:
 reducing, by the system, at least one of a memory usage or a communication overhead utilized to transfer data between layers of the deep learning system based on the applying of the quantization scale value.

10. The computer-implemented method of claim 2, wherein the offset value and a type of rounding utilized to generate the quantized weights is determined based on a type of application or model associated with the deep learning system.

11. A system, comprising:
 a memory that stores computer-executable components; and
 a processor, operatively coupled to the memory, that executes computer-executable components, the computer-executable components comprising:
  a quantizer management component that, for a set of weights:
   determines a quantization scale based on a number of quantization levels, wherein the quantization scale comprises quantization scale values; and
   determines, based on a defined quantization criterion relating to the quantization error, a quantization scale value that reduces a quantization error of weights of the set of weights and an offset value based on a type of weight distribution of the set of weights; and
  a quantizer component that quantizes weights of at least a portion of a layer of the set of weights to generate quantized weights based on the quantization scale value and the offset value and applies the quantization scale value to generate the quantized weights in one or more minibatches to facilitate training a deep learning model or generating an inference by the deep learning model.

12. The system of claim 11, wherein the quantizer component at least one of symmetrically or uniformly quantizes the weights, and utilizes rounding to generate the quantized weights based on the quantization scale value.

13. The system of claim 11, wherein the set of weights comprises a weight, and wherein the quantizer management component estimates the quantization scale value to apply to the weight as a linear or a non-linear function of a first statistical function of a weight value of the weight and a linear or a non-linear function of a second statistical function of the weight value, and wherein the first statistical function is different from the second statistical function.

14. The system of claim 11, wherein the quantization scale value is associated with a quantization error within a defined value distance of a minimum quantization error.

15. The system of claim 11, wherein the quantizer management component estimates the quantization scale value based on the defined quantization criterion, wherein the quantization scale value reduces the quantization error of the weights to have the quantization error be within a defined value distance of a minimum quantization error of the weights associated with any quantization scale value.

16. The system of claim 11, wherein the quantizer component reduces a bit precision associated with the weights based on the application of the quantization scale value.

17. The system of claim 11, wherein the quantizer component reduces at least one of a memory usage or a communication overhead used to transfer data between layers of the deep learning model based on the application of the quantization scale value.

18. The system of claim 12, wherein the quantizer component determines the offset value and a type of rounding utilized to generate the quantized weights based on a type of application or model associated with the deep learning system.

19. A computer program product that facilitates quantizing weights, the computer program product comprising a computer readable storage medium having program instructions embodied therewith, the program instructions are executable by a processor to cause the processor to:
 for a set of weights, determine a quantization scale as a function of a bit precision level, wherein the quantization scale comprises quantization scale values;
 determine a quantization scale value of the quantization scale values that reduces a quantization error of the set of weights in accordance with a defined quantization criterion relating to the quantization error and an offset value based on a type of weight distribution of the set of weights;

quantize weights of at least a portion of a layer of the set of weights to generate quantized weights based on the quantization scale value and the offset value to facilitate training a deep learning system or producing an inference by the deep learning system.

20. The computer program product of claim 19, wherein to facilitate the determining the quantization scale value, the program instructions are executable by a processor to cause the processor to:

estimate the quantization scale value to apply to a weight of the set of weights as a linear or a non-linear function of a first statistical function of a weight value of the weight and a linear or a non-linear function of a second statistical function of the weight value, wherein the first statistical function is different from the second statistical function, and wherein the quantization scale value is associated with a quantization error within a defined value distance of a minimum quantization error.

* * * * *